United States Patent
Orschek et al.

(10) Patent No.: US 6,345,594 B1
(45) Date of Patent: Feb. 12, 2002

(54) METHOD FOR CORRECTING HOT MANIFOLD CONDITION IN A TURBOCHARGED DIESEL ENGINE

(76) Inventors: Edward J. Orschek, 8504 Gulf Rd., North East, PA (US) 16428; Ronald H. Till, 6161 Heidler Rd., Fairview, PA (US) 16415

( * ) Notice: Subject to any disclaimer, the term of this patent is extended or adjusted under 35 U.S.C. 154(b) by 0 days.

(21) Appl. No.: 09/563,972

(22) Filed: May 3, 2000

(51) Int. Cl.⁷ .................................................. F01P 7/00
(52) U.S. Cl. .................................. 123/41.15; 123/41.05
(58) Field of Search ........................ 123/41.15, 41.05, 123/41.13

(56) References Cited

U.S. PATENT DOCUMENTS

| | | | |
|---|---|---|---|
| 4,779,577 A | * | 10/1988 | Ritter et al. ............... 123/41.05 |
| 4,916,902 A | * | 4/1990 | Pratt et al. ................ 123/41.05 |
| 5,174,259 A | | 12/1992 | Shinzawa |
| 5,201,285 A | | 4/1993 | McTaggart |
| 5,415,147 A | | 5/1995 | Nagle et al. |
| 5,544,486 A | | 8/1996 | Lu |
| 5,612,672 A | * | 3/1997 | Ino et al. .................. 123/41.15 |
| 5,724,941 A | * | 3/1998 | Suzuki et al. ............. 123/41.15 |
| 5,806,011 A | | 9/1998 | Azzaro et al. |
| 5,884,243 A | * | 3/1999 | Taniguchi et al. ........ 123/41.05 |
| 6,045,482 A | * | 4/2000 | Nishar et al. ............. 123/41.13 |
| 6,169,953 B1 | * | 1/2001 | Panoushek et al. ...... 123/41.15 |

* cited by examiner

*Primary Examiner*—Marguerite McMahon
*Assistant Examiner*—Jason A Benton
(74) *Attorney, Agent, or Firm*—Terry M. Sanks, Esq.; Beusse Brownlee Bowdoin & Wolter, PA

(57) ABSTRACT

A method and system for detecting and correcting a Hot Manifold condition that occurs in turbocharged diesel engines where intake air used for combustion exceeds an acceptable operating temperature where sensors monitor conditions indicative of the Hot Manifold condition and power level reduction, speed control limits, varying coolant system operations, and cycling flow valves are controlled by a processor to correct the Hot Manifold condition.

10 Claims, 3 Drawing Sheets

METHOD FOR CORRECTING HOT MANIFOLD CONDITION IN A TURBOCHARGED DIESEL ENGINE

BACKGROUND OF THE INVENTION

The present invention relates to turbocharged diesel engines and more specifically to a method and control system for correcting a condition that occurs when intake air used for combustion inside of a turbocharged diesel engine exceeds an acceptable operating temperature.

Turbocharged diesel engines are often used to power locomotives. The turbocharger compresses the air, providing more air for combustion. However, the process of compressing the air increases the temperature of the air. In order for the turbocharged diesel engine to perform properly, the air being supplied for combustion must not exceed a certain temperature limit. Proper air temperature is normally maintained with a heat exchanger that uses a cooling medium, such as water, to reduce the air temperature after leaving the turbocharger. This cooled air then travels to the cylinders via an air-intake manifold.

During operation though, problems or operating conditions may arise that result in the intake manifold air temperature exceeding a maximum allowable temperature limit. The elevated temperature may result in operating characteristics which could lead to engine damage or failure. This condition is known as a Hot Intake Manifold or Hot Manifold condition.

Instead of replacing existing turbocharged diesel engines with new engines mechanically designed to better control air temperature, the locomotive industry would benefit from a system which takes corrective action when a Hot Intake Manifold condition is detected. Currently, when a Hot Manifold condition is experienced, all power is removed and the engine is simply idled which results in the engine being unusable until it is returned to a maintenance facility for repair.

Towards this end, it would be beneficial to have a method and control system which upon identifying a Hot Manifold condition automatically attempts to correct the Hot Manifold condition without or with minimum human interface, and even if the condition is not fully corrected, it would be desirable to provide a system and method that would allow the locomotive engine to continue operating at a safe operating level.

SUMMARY OF THE INVENTION

The present invention comprises a method for detecting a Hot Manifold condition in an internal combustion engine comprising determining whether to initiate correction of said Hot Manifold condition based on received samples of monitored data indicative of said Hot Manifold condition. The present invention also comprises a method for correcting a Hot Manifold condition upon detection of the condition in an internal combustion engine comprising limiting the engine to a predetermined speed; applying a throttle level threshold limit; and varying a cooling system's mode for cooling the engine's cylinders and intercoolers. The present invention also comprises a control system for detecting and correcting the Hot Manifold condition within an internal combustion engine, the system comprising a processor for determining when to initiate and correct a Hot Manifold correction strategy based on received monitored data indicative of the Hot Manifold condition; a plurality of sensors to measure temperature at various engine locations, wherein the processor is operable to determine and change operating conditions of the engine when determining whether to initiate the Hot Manifold correction strategy and in correcting the Hot Manifold condition.

BRIEF DESCRIPTION OF THE DRAWINGS

For a better understanding of the present invention, reference may be had to the following detailed description taking in conjunction with the accompanying drawings in which.

DETAILED DESCRIPTION OF THE INVENTION

Figure 1:
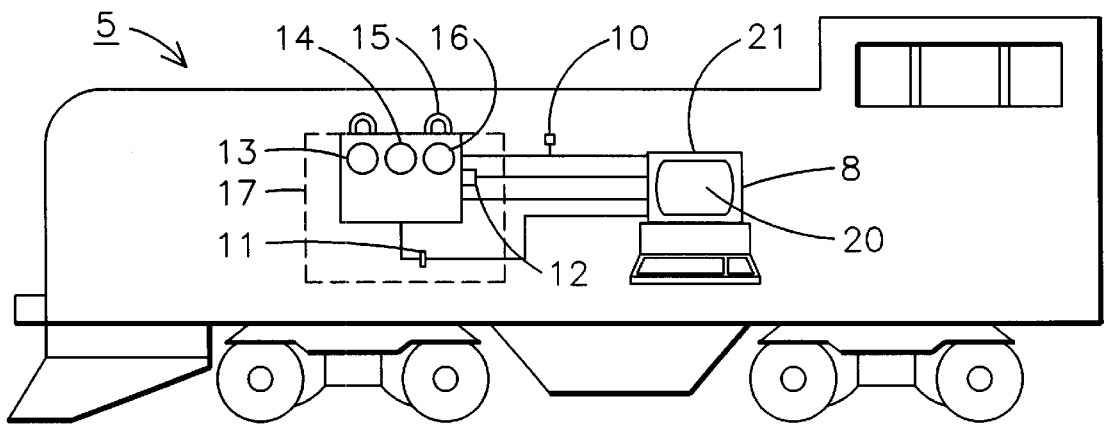
FIG. 1 shows a simplified schematic of an exemplary locomotive that may benefit from a control system embodying the present invention for determining and correcting a Hot Manifold condition.

FIG. 1 shows an exemplary control system used to determine and correct a Hot Manifold condition. In one preferred embodiment, the locomotive 5 uses a computer or processor 8 to monitor and control an engine cooling control system 15, which is integrated with several temperature sensors 10, 11, 12. As will be understood by those or ordinary skill in the art, FIG. 3 does not illustrate cooling valves. The cooling system 15 includes cooling valves and a cooling mode which involves a radiator, cylinders, piston housing, and intercoolers.

When correcting a Hot Manifold condition, the processor 8 also monitors and controls a throttle level 13 of the locomotive, speed of the locomotive 14, and operation mode 16 of the locomotive. One temperature sensor 10 is positioned to measure the ambient air temperature. Another temperature sensor 11 is positioned to measure the temperature of the locomotive engine to assess if a Hot Manifold condition is developing. A third temperature sensor 12 is positioned to measure the water temperature used to control the valves and radiator fan of the engine cooling system. Based on the sensor readings, the computer 8 controls the engine 17 and the cooling system 15 to prevent a Hot Manifold condition. The computer 8 also includes a monitor or monitor station 20 that displays messages to an on-board operator when the locomotive 5 experiences a Hot Manifold condition, and the computer 8 also maintains, in a memory storage device 21, a permanent historical record of Hot Manifold conditions experienced for use during maintenance of the locomotive.

Figure 2:
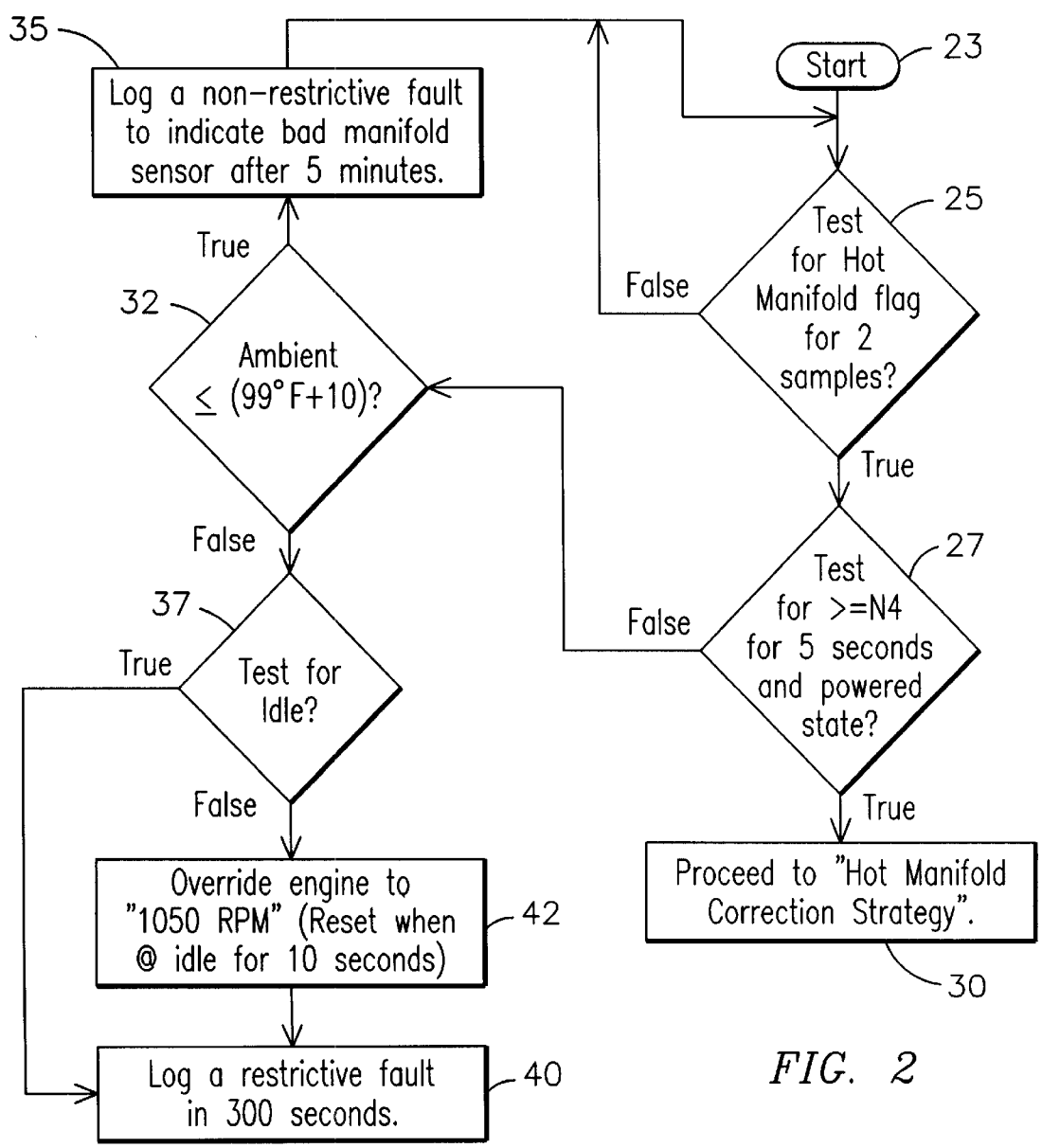
FIG. 2 is a flow chart for determining when a locomotive should utilize a Hot Manifold Correction Strategy.

FIG. 2 is a flow chart for determining when a locomotive should execute a Hot Manifold Correction Strategy. The system starts at step 23 by determining at step 25 whether a Hot Manifold condition exists. For example, if two consecutive engine temperature samples both confirm a Hot Manifold condition, the system next makes a determination at step 27 as to the present power level of the locomotive engine. If the locomotive is operating at a power level that is above a given threshold power, for a predetermined time, the system will then proceed to the Hot Manifold Correction Strategy 30 as described in the context of FIG. 3. In one exemplary embodiment used on a General Electric manufactured locomotive, the power limit threshold is set to correspond to throttle notch position N4, and the predetermined time is five seconds. It will be appreciated by those skilled in the art that other values for the foregoing parameters may be used depending on the specific locomotive application.

If the power level threshold is not exceeded within the designated time, the system will measure at step 32 the ambient air temperature to verify whether the ambient air is above a given temperature threshold. In one exemplary embodiment, the ambient air temperature threshold is 109° F. which is actually 99° F. plus ten degrees to account for an offset of sensor temperature from actual ambient temperature. If the system continues sensing that ambient air temperature is less than the threshold temperature after a designated time, such as five minutes, after determining at step 27 that the Hot Manifold Correction Strategy 30 is not needed, the system will assume a bad or defective manifold temperature sensor is causing this reading, and log at step 35 a non-restrictive fault record of the event to indicate a bad manifold sensor.

If the ambient temperature is more than the threshold temperature, the system will then determine at step 37 whether the engine is in an idle mode, that is, the engine 17 is not in another operation mode, such as motoring, braking, self load, self open, Head End Power (HEP) standby, or HEP normal operation mode. If the engine 17 is in idle, the control system will log at step 40 a restrictive fault if this condition continues for a designated time period. In one exemplary embodiment, the control system will not log at step 40 a restrictive fault until the fault is detected for a time period of three hundred seconds.

If the test at step 37 for idle determines that the engine 17 is not in idle, the control system will override at step 42 the engine speed to operate at a predetermined number of revolutions per minute (RPM) such as 1050 RPM. This override condition will reset when the throttle returns to idle for a predetermined time period, such as ten seconds.

Figure 3A:
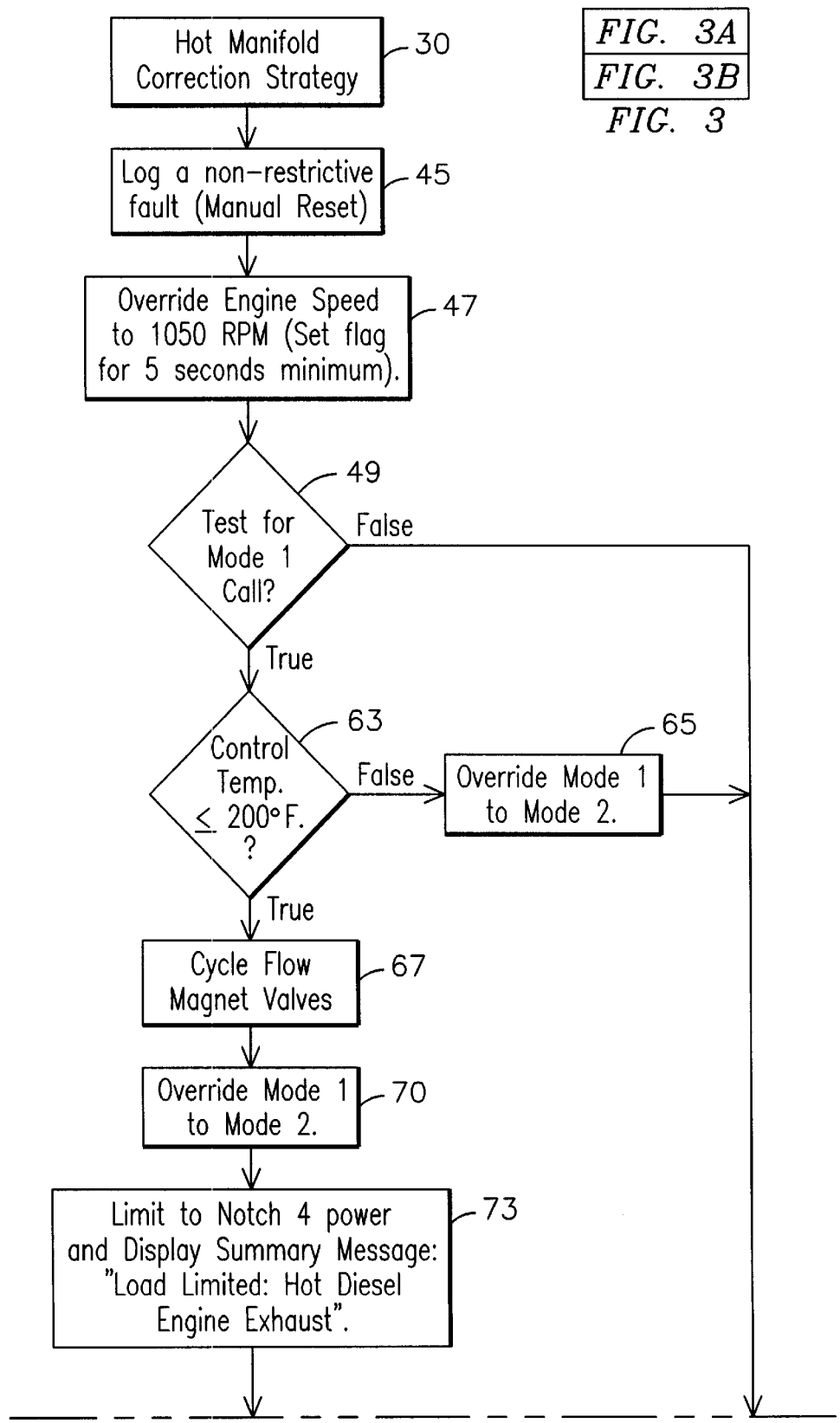
FIG. 3 is a flow chart of the Hot Manifold Correction Strategy.
Figure 3B:
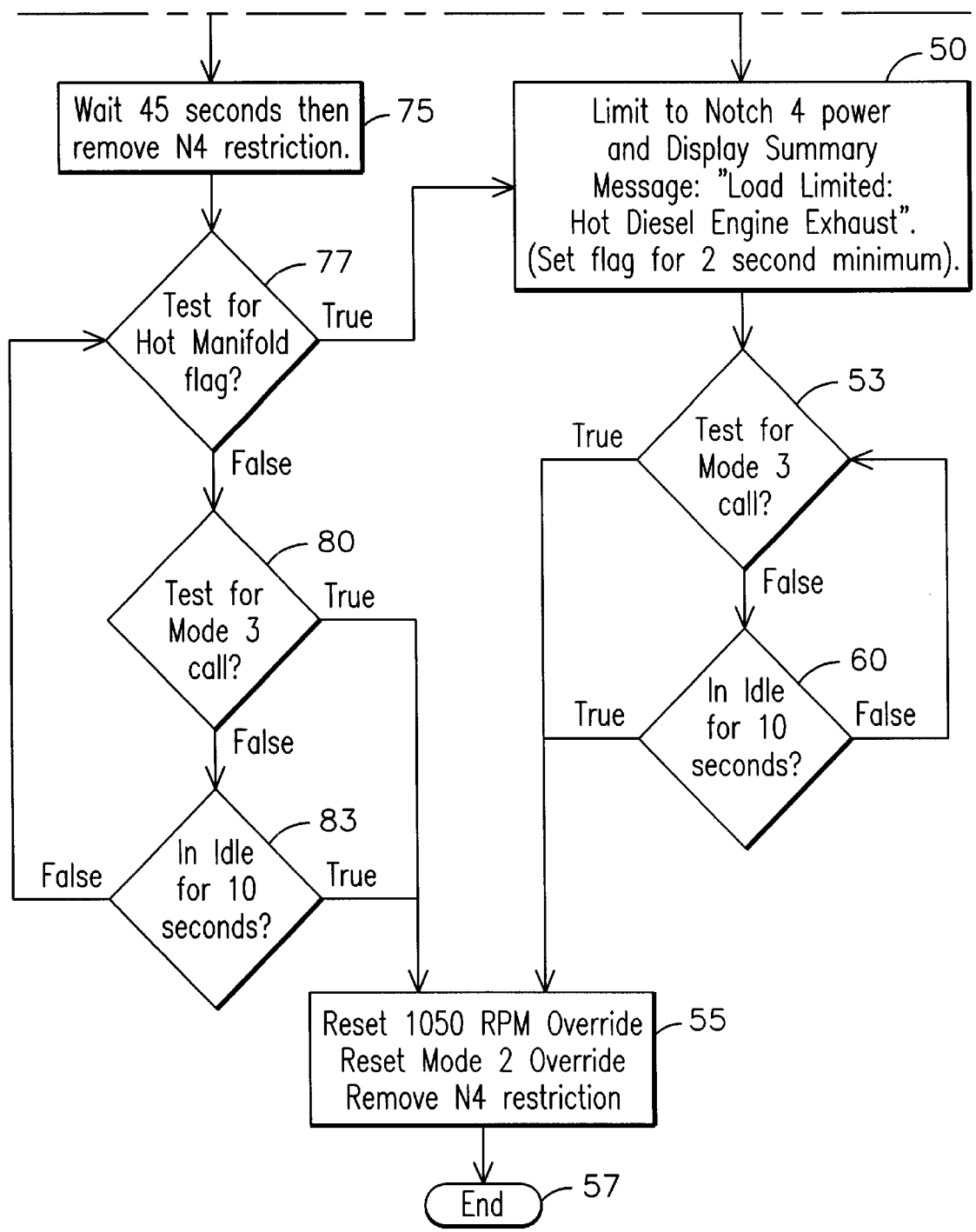

FIG. 3 is a flow chart of the Hot Manifold Correction Strategy. Upon entering the Hot Manifold Correction Strategy 30, the control system logs at step 45 a non-restrictive fault, and a text message is displayed to an on-board operator. A record of this occurrence is also recorded in the computer's memory. The control system then overrides at step 47 the engine speed whereby the engine then operates at a predetermined RPM, such as 1050 RPM. This override at step 47 will reset when the throttle returns to idle for a predetermined period, such as ten seconds in one exemplary embodiment. The control system then tests at step 49 for an operating mode of the cooling system where the cooling water supply for both the diesel engine cylinders and the intercoolers is being circulated through the radiators. This operating mode of the cooling system is referred to as Mode 1.

As will be understood by those skilled in the art, generally there may be two distinct requirements for cooling a turbocharged diesel engine. For example, some of the cooling water is used to cool the cylinders, specifically the piston housing, and some of the cooling water is used to cool the intake manifold air via the intercoolers. Accordingly, there are two additional distinct cooling system modes addressed by the Hot Manifold Correction Strategy of the present invention, e.g., Mode 2 and Mode 3. Mode 2 refers to the operating mode where the water used to cool the engine cylinders is circulated through the radiators but the water supply for the intercoolers is taken from the water returned from the diesel engine cylinders. Mode 3 refers to the operating mode when there is no available cooling water from the radiators. In this mode, the water supply for the intercoolers is taken from the water being returned from the diesel engine cylinders. Mode 3 is established because, as suggested above, water is not always present in the radiator, and under some conditions water is sent to the radiator only when cooling is necessary.

If the cooling system is not calling for Mode 1 operation, then the control system will limit the engine at step 50 to the predetermined engine power level, such as notch level N4 in one exemplary embodiment, and notify the on-board user that the engine is in a limited load operation mode via the computer monitor 20 or other suitable message board. The locomotive will continue operating in this restricted mode until conditions are met which will cause the locomotive to no longer operate in the Hot Manifold Correction Strategy mode 30.

To determine when the locomotive may leave the Hot Manifold Correction Strategy, the control system will begin by determining at step 53 if a Mode 3 call is initiated. If a Mode 3 call is initiated, then the control system will reset at step 55 the RPM override, remove the power level restriction, and then leave the Hot Manifold Correction Strategy 30 and begin operating normally at step 57. If the Mode 3 call is not initiated, the control system will determine at step 60 whether the system is in an idle mode for a given time, such as 10 seconds. If the engine is in the idle mode, then the control system will reset at step 55 the RPM override, remove the power level restriction, and then leave the Hot Manifold Correction Strategy 30 and begin operating normally 57. If the control system has not idled for a given time, such as ten seconds, then the control system will again test at step 53 for a Mode 3 call and repeat the above discussed steps 55, 57, 60 until such time that one of the above steps allows the system to return to normal operation.

If the control system tests at step 49 positive for a Mode 1 operating call, the control system will check at step 63 the control temperature. As suggested above, the control temperature may be determined by sensors placed to record the engine inlet water temperature. If the control temperature exceeds a predetermined temperature, such as 200° F. in one exemplary embodiment, the system will override Mode 1 and go to Mode 2 at step 65. The control system will then limit at step 50 the engine to the predetermine power level, such as notch level N4, and notify the on-board user that the engine is in a limited load operation mode via the computer monitor 20. The locomotive will continue operating in this restricted mode until the above mentioned tests and conditions at steps 50, 53, 60, 55 are met which causes the locomotive to no longer operate in the Hot Manifold Correction Strategy mode 30.

If the control temperature test executed at step 63 determines that the temperature is less than or equal to the predetermined temperature such as 200 F., the control system will cycle at step 67 the respective state of the flow magnet valves of the coolant valves at a predetermined rate, such as one complete cycle of on/off or off/on every second for three seconds or three full cycles total. The cooling valves should preferably be returned to their respective original state unless a new mode requirement was received during the cycling. The control system should then override at step 70 Mode 1 to Mode 2. The control system should then limit at step 73 the power level to a predetermined level, such as to notch level N4, and display a message to the on-board user about the load limit. After waiting at step 75 a designated period, such as forty-five seconds, the system should remove the power level restriction. This cycling should only occur once prior to the forty-five second wait period of this Hot Manifold Correction Strategy. The cycling of the flow magnet valves shall not interfere with normal operation of the radiator fan.

As illustrated in FIG. 3, the control system should then perform the test executed at step 77 to determine if a Hot Manifold condition still exists. If the control system detects a Hot Manifold condition, then the control system will continue to limit at step 50 the engine to the predetermine power level, notch level N4 in one exemplary embodiment, and continue notifying the on-board user that the engine is still in a limited load operation mode via the computer monitor 20. The locomotive will continue operating in this restricted mode until tests and the respective conditions based upon steps 53, 60, 55 are met which causes the locomotive to no longer operate in the Hot Manifold Correction Strategy mode 30.

If the Hot Manifold condition does not exist, the control system should then test at step 80 for Mode 3 call. If it does exist, the control system should reset at step 55 the RPM override, reset Mode 2 override and return to normal operation at step 57. If the Mode 3 call does not exist, the control system will determine at step 83 if the engine 17 has idled for a given time, such as ten seconds. If the engine 17 has idled for the given time, the control system will reset at step 55 the RPM override, reset Mode 2 override and return to normal operation at step 57. If the engine 17 has not idled for the given time period, the control system will again test at step 77 for a Hot Manifold condition as depicted in FIG. 2.

While the invention has been described in what is presently considered to be the preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A method for correcting a Hot Manifold condition within an internal combustion engine while continuing to operate said engine to propel a vehicle, the method comprising the following steps:

(a) setting said engine to a predetermined speed;
   (b) determining whether a cooling system of said engine is circulating a coolant through a radiator fluidly coupled to said engine before cooling a plurality of cylinders and intercoolers of said engine;
   (c) determining whether a predetermined temperature is exceeded;
   (d) cycling valves of said coolant system at a predetermined rate;
   (e) cooling said cylinders and intercoolers with said cooling system operation mode where said coolant is circulated through a radiator and then cooling said cylinders and said intercoolers before said coolant returns to said radiator;
   (f) operating said engine at a predetermined throttle level for a predetermined time period;
   (g) determining whether said Hot Manifold condition still exists;
   (h) testing whether said cooling system is operating in a mode where said system is circulating coolant between said cylinders and intercoolers without returning coolant to said radiator when no Hot Manifold condition is detected;
   (i) resetting said engine speed when said cooling system is circulating coolant between said cylinders and intercoolers without returning coolant to said radiator.

2. The method of claim 1 wherein step (b) further comprises limiting said throttle level to a predetermined level when said cooling system is not circulating coolant through a radiator before cooling said engine's cylinders and intercoolers simultaneously.

3. The method of claim 2 further comprising resetting said engine speed when said cooling system is circulating coolant between said cylinders and intercoolers without returning coolant to said radiator.

4. The method of claim 3 further comprising determining whether said engine is in an idle mode of operation for a predetermined period when said cooling system is not circulating coolant between said cylinders and intercoolers without returning coolant to said radiator.

5. The method of claim 4 further determines whether said cooling system is circulating coolant between said cylinders and intercoolers without returning coolant to said radiator.

6. The method of claim 1 wherein step (c) further comprises transitioning to a coolant system mode where said coolant used to cool said cylinders is circulated through a radiator whereas said coolant to cool said intercoolers is diverted from said cylinders before coolant returns to said radiator.

7. The method of claim 1 wherein step (c) further comprises limiting said throttle level to a predetermined level when said temperature does not exceed said predetermined level.

8. The method of claim 7 further comprising resetting said engine speed when said cooling system is circulating coolant between said cylinders and intercoolers without returning coolant to said radiator.

9. The method of claim 8 further comprising determining whether said engine is in an idle mode of operation for a predetermined period when said cooling system is not circulating coolant between said cylinders and intercoolers without returning coolant to said radiator and then determines whether said cooling system is circulating coolant between said cylinders and intercoolers without returning coolant to said radiator.

10. The method of claim 1 further comprising notifying an on-board user of said Hot Manifold condition.

* * * * *